US011902767B2

(12) United States Patent
Willis et al.

(10) Patent No.: US 11,902,767 B2
(45) Date of Patent: Feb. 13, 2024

(54) COMBINING PRERECORDED AND LIVE PERFORMANCES IN A VEHICLE

(71) Applicant: Harman International Industries, Incorporated, Stamford, CT (US)

(72) Inventors: Maxwell B. Willis, Detroit, MI (US); Christopher Michael Trestain, Livonia, MI (US); Chris Ludwig, Bloomfield Hills, MI (US)

(73) Assignee: HARMAN INTERNATIONAL INDUSTRIES, INCORPORATED, Stamford, CT (US)

( * ) Notice: Subject to any disclaimer, the term of this patent is extended or adjusted under 35 U.S.C. 154(b) by 8 days.

(21) Appl. No.: 17/644,547

(22) Filed: Dec. 15, 2021

(65) Prior Publication Data

US 2022/0210593 A1 Jun. 30, 2022

Related U.S. Application Data

(60) Provisional application No. 63/132,423, filed on Dec. 30, 2020.

(51) Int. Cl.

*H04S 7/00* (2006.01)
*H04R 3/00* (2006.01)
*H04R 1/40* (2006.01)
*H04S 3/00* (2006.01)
*H04R 5/04* (2006.01)
*H04R 5/02* (2006.01)

(52) U.S. Cl.

CPC ............... *H04S 7/30* (2013.01); *H04R 1/406* (2013.01); *H04R 3/005* (2013.01); *H04R 5/02* (2013.01); *H04R 5/04* (2013.01); *H04S 3/008* (2013.01); *H04R 2430/01* (2013.01); *H04R 2499/13* (2013.01); *H04S 2400/01* (2013.01); *H04S 2400/13* (2013.01)

(58) Field of Classification Search

CPC ........ H04S 7/30; H04S 3/008; H04S 2400/01; H04S 2400/13; H04R 1/406; H04R 3/005; H04R 5/02; H04R 5/04; H04R 2430/01; H04R 2499/13

USPC ......... 381/56, 58, 94.2, 94.5, 102, 104, 106, 381/302, 303

See application file for complete search history.

(56) References Cited

U.S. PATENT DOCUMENTS

2010/0107856 A1* 5/2010 Hetherington ......... G10H 1/366 84/610
2014/0219478 A1* 8/2014 Takahashi ............... H04S 1/007 381/119
2018/0190282 A1* 7/2018 Mohammad ......... G10K 11/178

* cited by examiner

*Primary Examiner* — William A Jerez Lora
(74) *Attorney, Agent, or Firm* — McCoy Russell LLP

(57) ABSTRACT

In some embodiments, methods and systems for combining a prerecorded performance with a live performance within a space (such as a vehicle) are disclosed. A first performance (which may be a prerecorded performance) may be started within the space, and a second performance (such as a live performance) may subsequently be initiated within the space as well. The second performance may be detected, and based upon the detection, one or more volume parameters of the first performance may be modified. One or more properties of the second performance may also be modified, and the modified first performance may then be combined with the modified second performance to create a combined performance.

20 Claims, 9 Drawing Sheets

400

COMBINING PRERECORDED AND LIVE PERFORMANCES IN A VEHICLE

CROSS REFERENCE TO RELATED APPLICATIONS

The present application claims priority to U.S. Provisional Application No. 63/132,423, entitled "COMBINING PRERECORDED AND LIVE PERFORMANCES IN A VEHICLE", and filed on Dec. 30, 2020. The entire contents of the above-listed application are hereby incorporated by reference for all purposes.

FIELD

The disclosure relates generally to combining prerecorded audio performances with live audio performances.

BACKGROUND

Many people enjoy singing, and singing along with others. In karaoke, a prerecorded audio performance may be played, and a performance by a live singer may be added to the prerecorded performance, with microphones being used to capture and amplify the live performance.

Karaoke may be performed at a variety of venues. In some instances, karaoke may be performed at a commercial venue using specialized equipment. In other instances, karaoke may be performed in a home setting.

Some environments may be less conducive to performing karaoke enjoyably, however. The nature of vehicular environments, for example, may hinder or obstruct karaoke performances. Beyond casual use, the nature of vehicular environments may also hinder or obstruct the use of a vehicle for serious or professional recording purposes.

SUMMARY

Performing karaoke in vehicular environments presents issues and obstacles not present in typical karaoke environments. Microphones and other equipment that may be relatively easily passed from person to person in a studio or home environment may be more cumbersome to pass back and forth in a moving vehicle, in which passengers are often physically restrained. Noise within the vehicle may also wax and wane in ways difficult to anticipate and address, due to changes in the noise level of the environmental outside the vehicle as the vehicle moves, and also due to changes in noise made by the vehicle itself (e.g., as it travels at different speeds).

In some embodiments, the issues described above may be addressed by starting a prerecorded performance within a space or environment (e.g., a vehicle), then detecting a live audio performance at an area (e.g., a seating area) within the space. One or more properties of the prerecorded performance may then be modified based upon the live audio performance. For example, a volume of some portion or aspect of the prerecorded performance may be lowered (which may be referred to herein as "ducking"), and a combined audio performance based upon the modified prerecorded performance and the live audio performance may be provided. In this way, the cumbersome passing of equipment within the space may be obviated, while permitting manipulation of audio volumes of the combined performance that may enhance enjoyment.

For some embodiments, the issues described above may be addressed by playing a first audio performance through speakers within a vehicle and recording a second audio performance at a seating zone of the vehicle. At least one audio volume associated with the first audio performance may be ducked based upon a detection of the second audio performance, and the second audio performance may then be played in addition to the first audio performance. In this way, detection of a live performance may be used to initiate a karaoke performance without the use of hand-held equipment, and various audio volumes related to the first performance and the second performance may be subject to various adjustments to enhance the karaoke experience.

In some embodiments, the issues described above may be addressed by incorporating within a vehicle a set of microphones (e.g., beamforming microphones) directed to a plurality of seating areas within the vehicle, and a set of speakers. The speakers may be arranged in a surround-sound configuration around at least a periphery of the plurality of seating areas. A prerecorded first audio performance may be played through the set of speakers, and a live second audio performance may be detected at an identified seating area of the plurality of seating areas, through the set of microphones. The second audio performance may be recorded, and one or more volumes of the first audio performance may be lowered based upon the second audio performance. The recorded second audio performance may then be played in combination with the modified first audio performance. In this way, an audio performance within the vehicle may be detected, which may lead to adjustments of various audio volumes of the first performance, the second performance, or both, which may help overcome noise issues within the vehicular environment.

In various embodiments, the methods and systems disclosed herein may accordingly improve various vehicle-based performances. In some instances, the methods and systems may improve karaoke performances which may be more or less casual in nature.

In other instances, the methods and systems may also enable or improve the capacity of vehicles to serve as serious or professional recording environments (such as recording studios). For example, a recording artist may use the methods and systems to record vocal tracks and other original content while in a vehicle. The resulting tracks may be professional-quality recordings, similar to recordings mastered in a conventional recording studio.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

BRIEF DESCRIPTION OF THE DRAWINGS

The disclosure may be better understood from reading the following description of non-limiting embodiments, with reference to the attached drawings, wherein below.

DETAILED DESCRIPTION

Figure 1A:
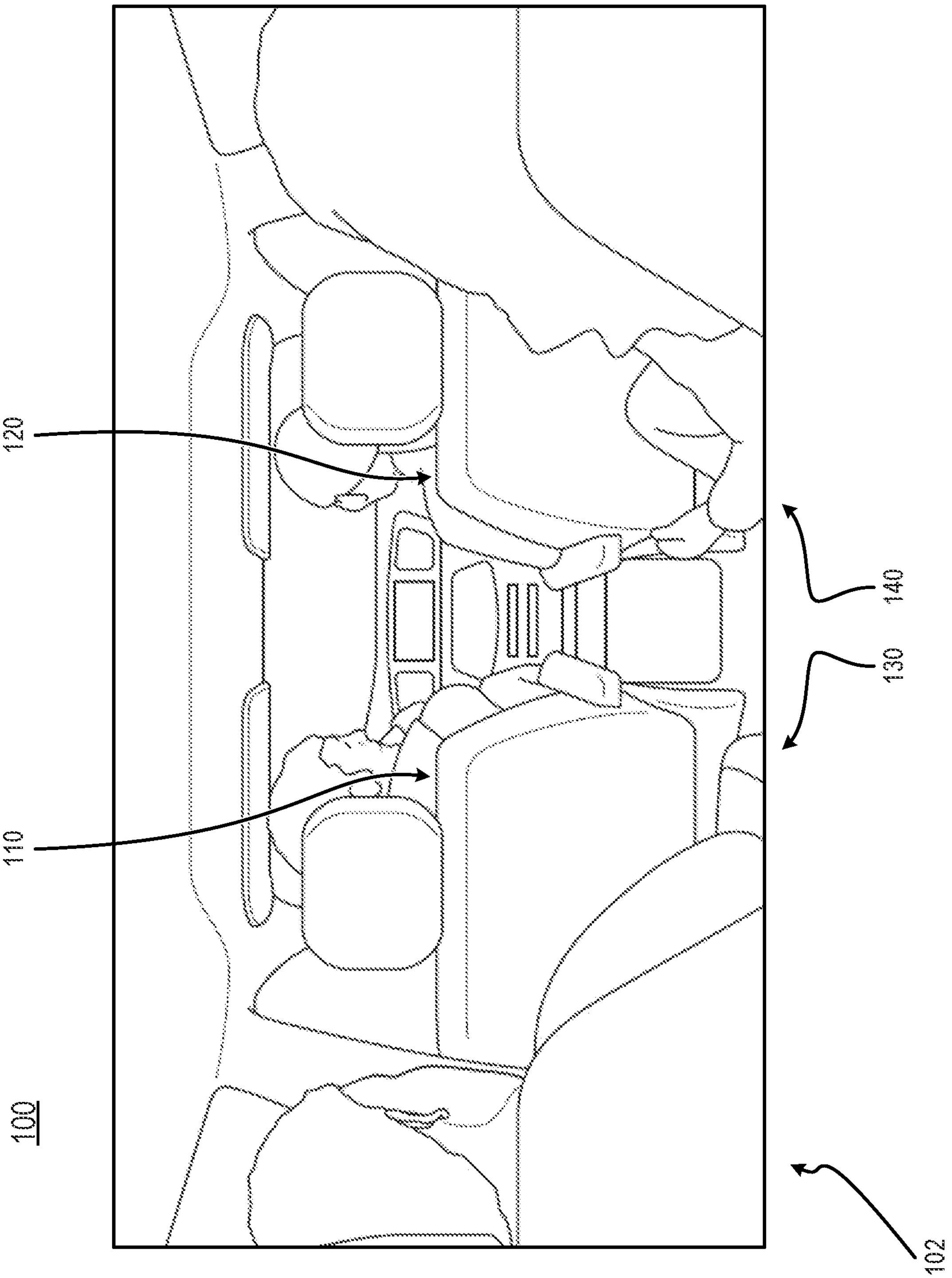
FIG. 1A shows a perspective view of an interior of a vehicle, in accordance with one or more embodiments of the present disclosure.
Figure 1B:
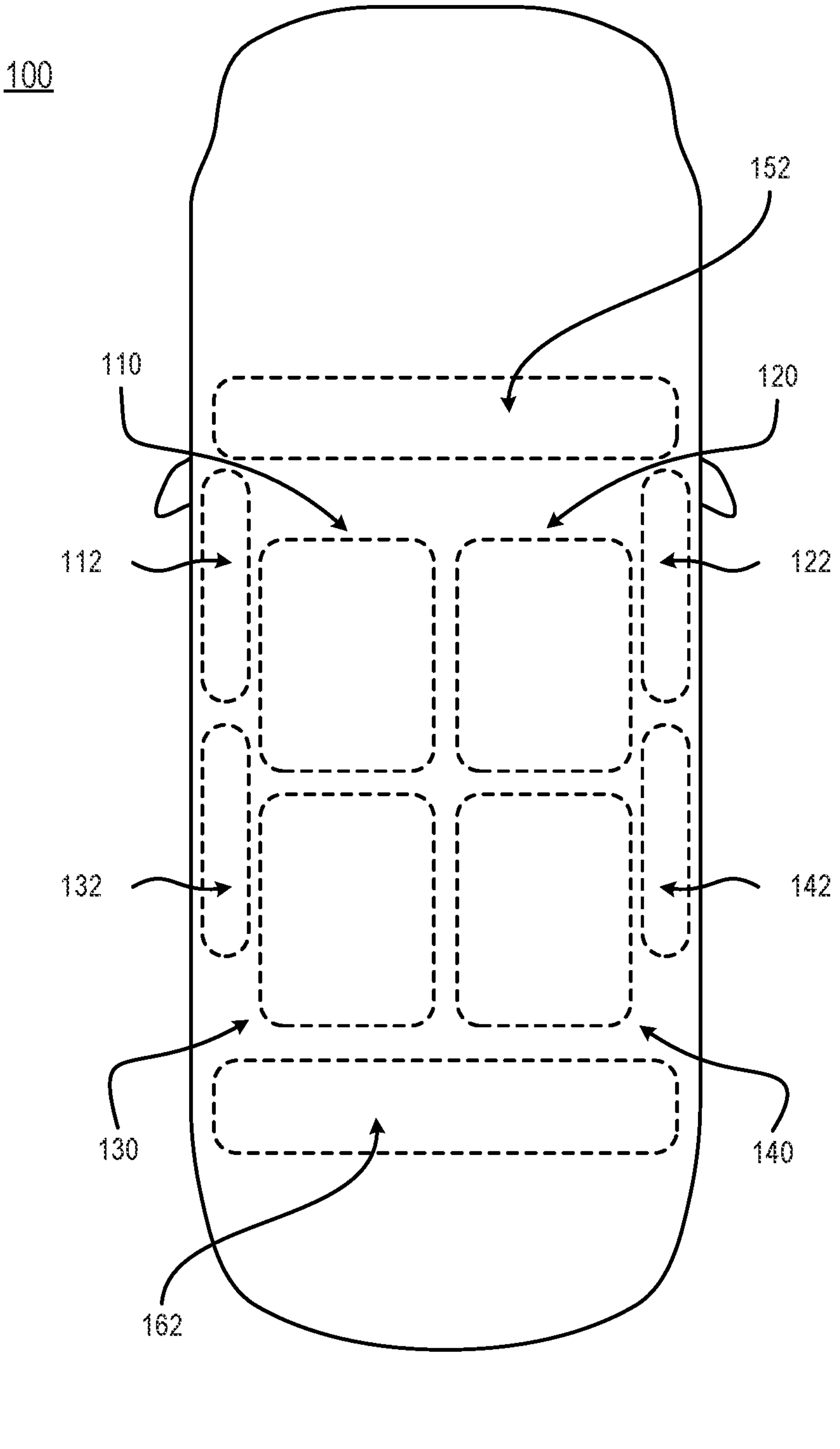
FIG. 1B shows a top view of a vehicle depicting general seating areas, door areas, and dashboard and rear deck areas, in accordance with one or more embodiments of the present disclosure.
Figure 1C:
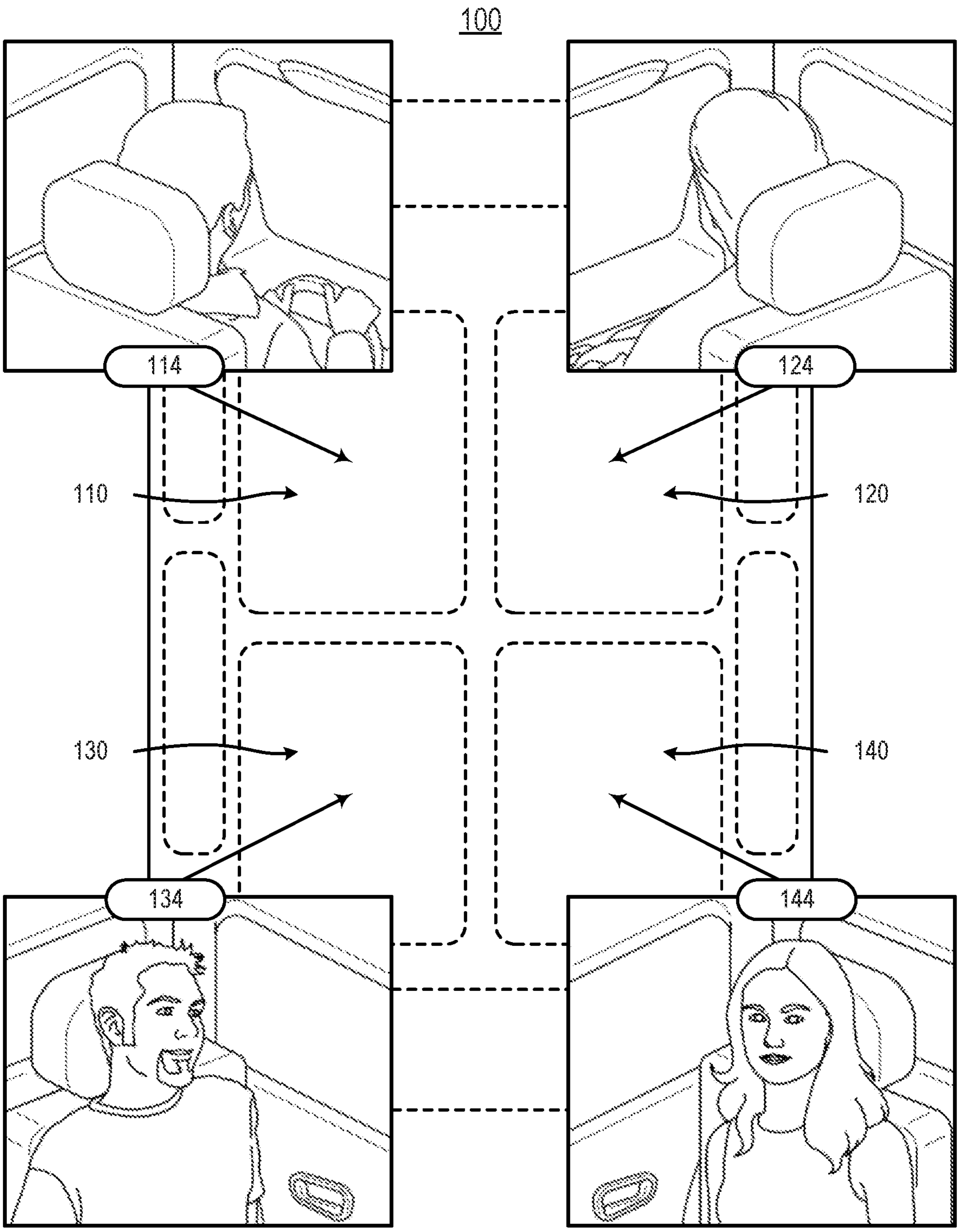
FIG. 1C shows a composite view depicting general seating areas, in accordance with one or more embodiments of the present disclosure.
Figure 2:
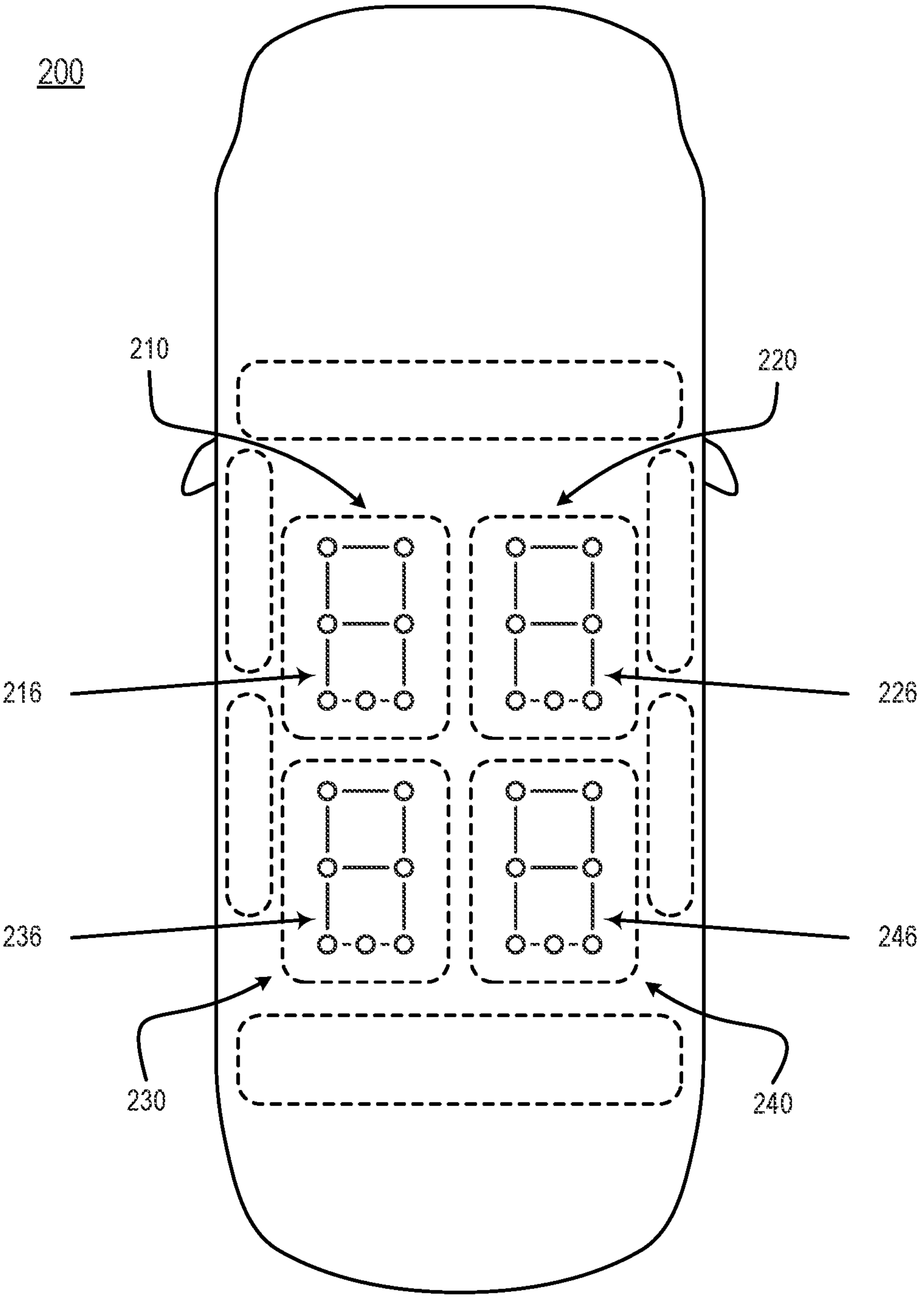
FIG. 2 shows a top view of a vehicle depicting general seating areas and microphone positions, in accordance with one or more embodiments of the present disclosure.
Figure 3:
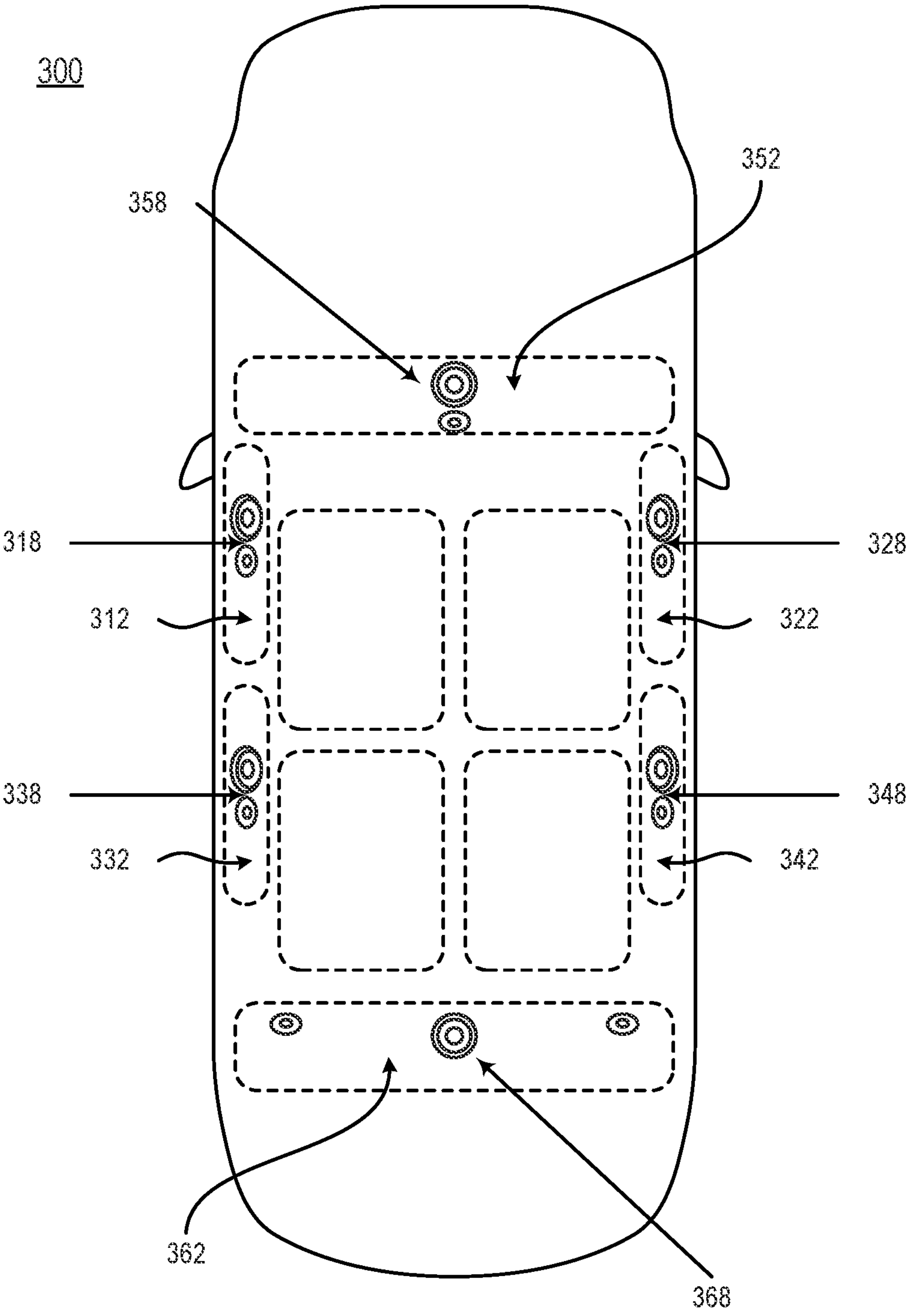
FIG. 3 shows a top view of a vehicle depicting general seating areas and speaker positions, in accordance with one or more embodiments of the present disclosure.
Figure 4:
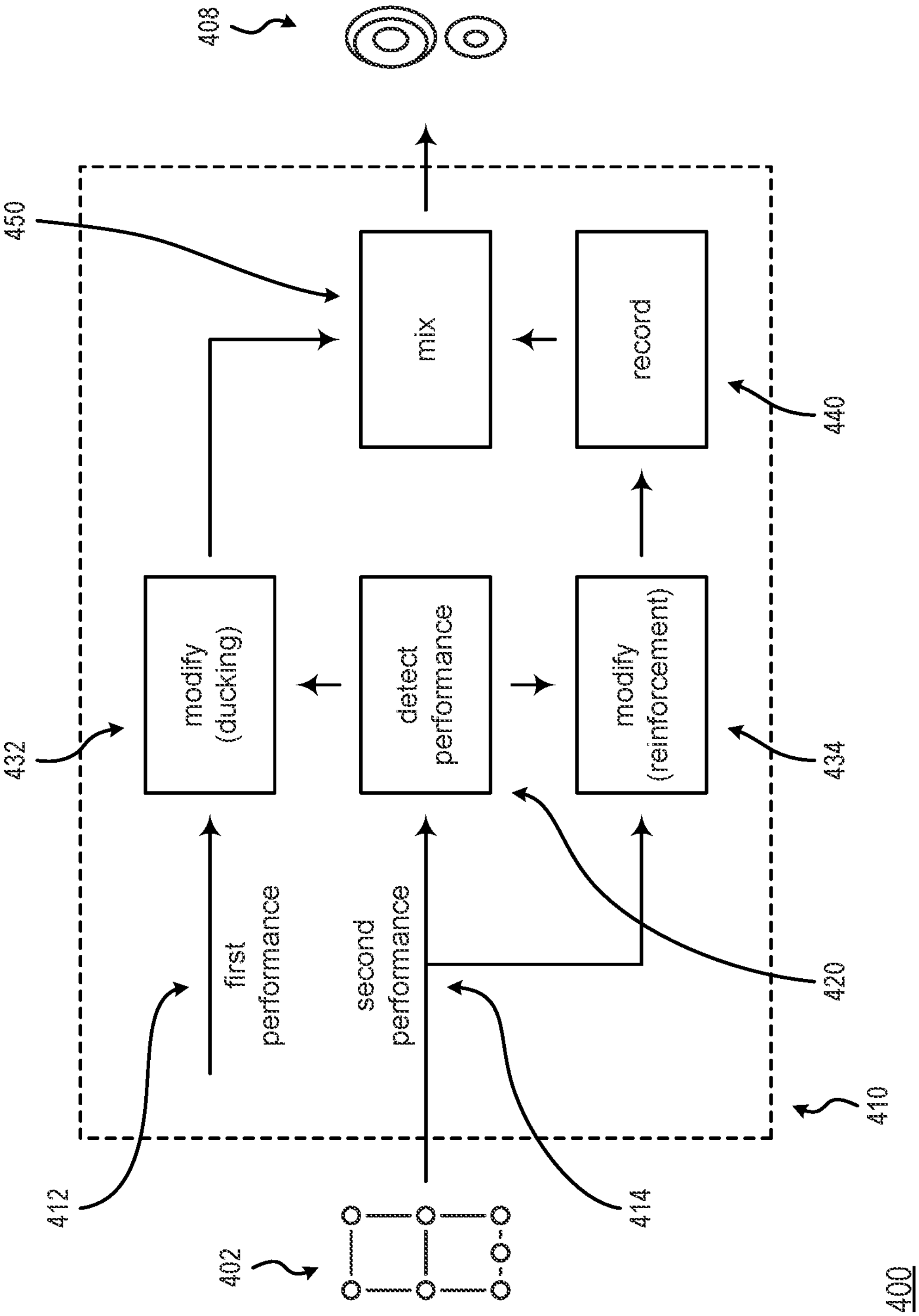
FIG. 4 shows a schematic view of portions of a system for combining two audio performances in a space, in accordance with one or more embodiments of the present disclosure.
Figure 5:
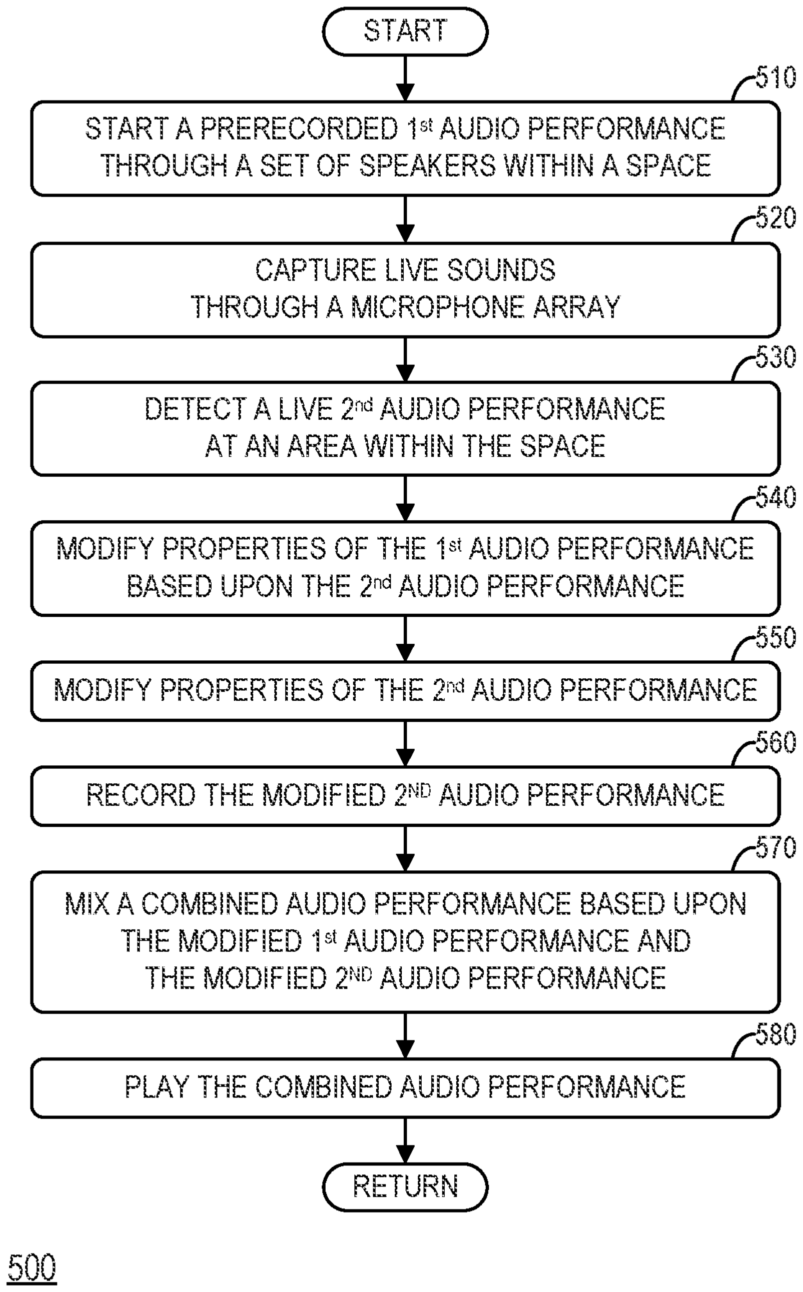
FIG. 5 shows a flow chart of a method for combining two audio performances in a vehicle, in accordance with one or more embodiments of the present disclosure.
Figure 6:
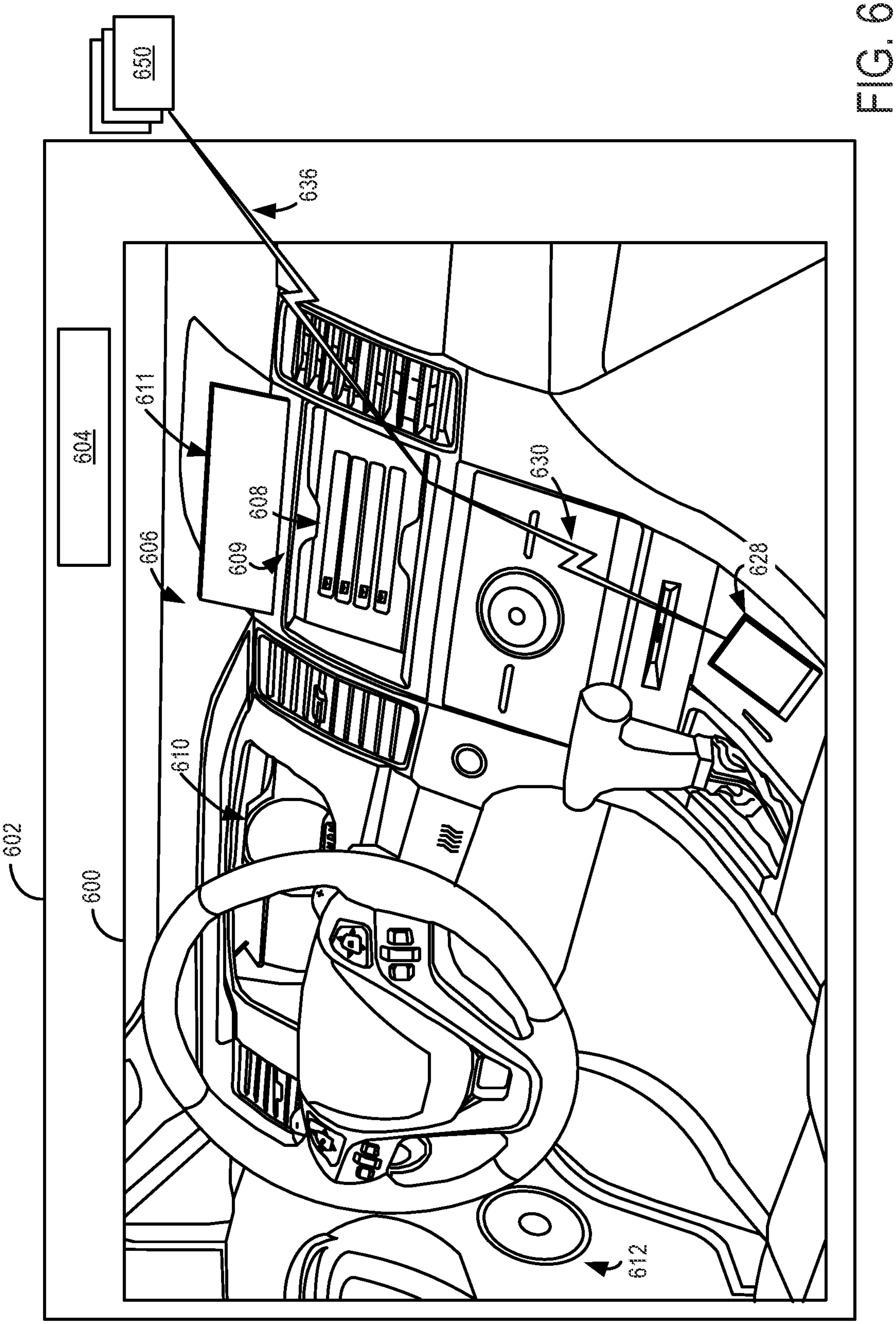
FIG. 6 shows an example partial view of a vehicle cabin, in accordance with one or more embodiments of the present disclosure.
Figure 7:
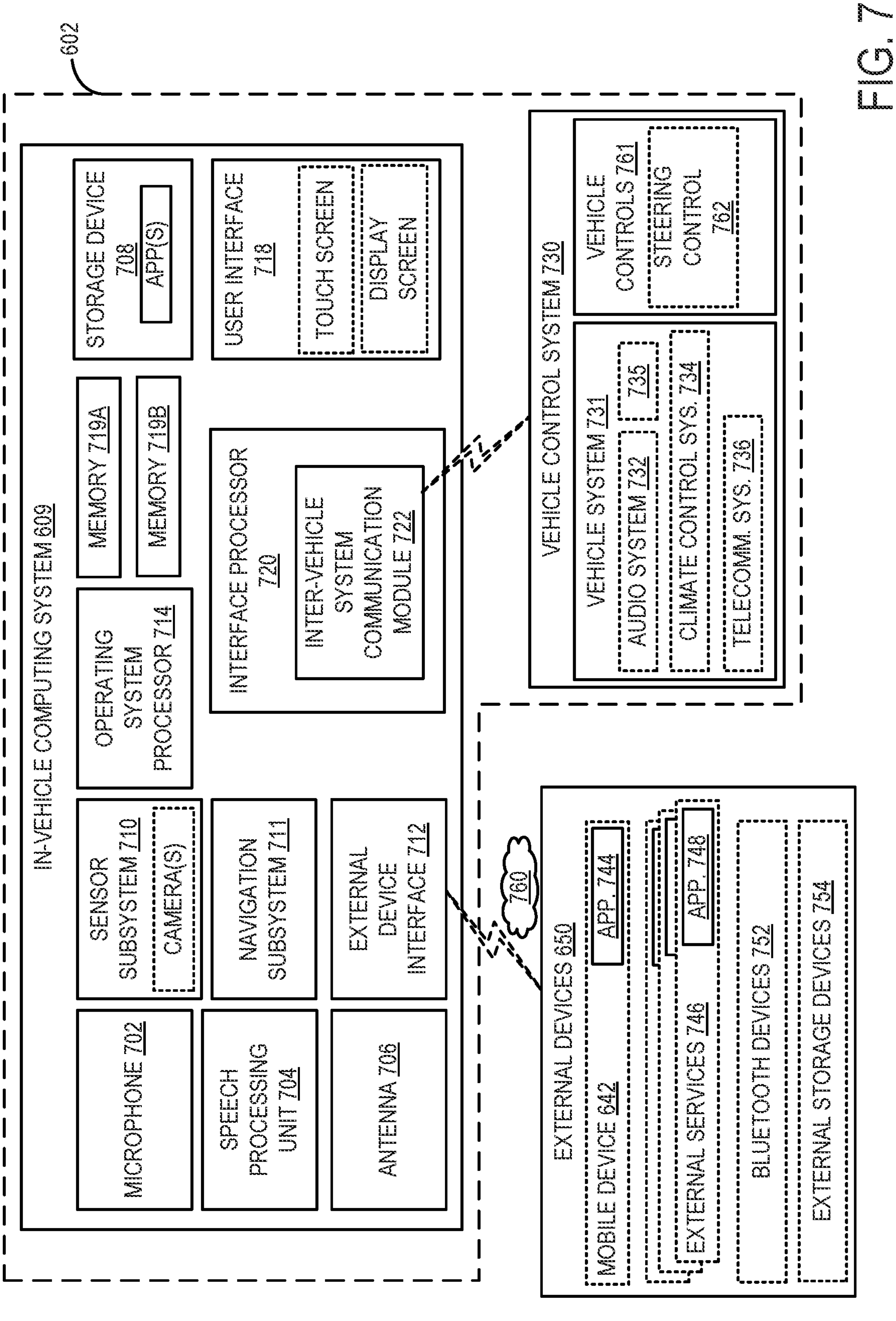
FIG. 7 shows an example in-vehicle computing system, in accordance with one or more embodiments of the present disclosure.

Disclosed herein are methods and systems for combining prerecorded audio performances and live audio performances within a vehicle. FIGS. 1A-1C show seating areas for passengers within a vehicle, as well as door areas, dashboard areas, and rear deck areas. FIG. 2 shows an exemplary placement of microphones with respect to the seating areas, while FIG. 3 shows an exemplary placement of a set of speakers (e.g., in a surround-sound configuration) with respect to the seating areas. FIG. 4 depicts portions of a system for combining a prerecorded audio performance and a live audio performance in a vehicle, and FIG. 5 shows a flow chart of methods for combining such audio performances in a vehicle. FIGS. 6 and 7 depict portions of a vehicle cabin, and an in-vehicle computing system therein, for combining audio performances within the vehicle.

Turning to FIG. 1A, a vehicle 100 may have an interior 102 (e.g., a cabin) comprising a plurality of seating areas for accommodating passengers. In a front portion of interior 102, a first seating area 110 may accommodate a driver and a second seating area 120 may accommodate a passenger alongside the driver. A third seating area 130 and a fourth seating area 140 may accommodate further passengers in a rear portion of interior 102.

Seating areas 110, 120, 130, and 140 may be approximate portions of interior 102 in which passengers may be seated. Seating areas 110, 120, 130, and 140 may accordingly encompass portions of the three-dimensional volume of interior 102 in which the heads and mouths of passengers may be situated. Accordingly, when passengers seated in interior 102 sing or otherwise engage in a vocal performance, the resulting audio performance may be positioned to originate from one of seating areas 110, 120, 130, and 140.

Although interior 102 is depicted as having four seating areas, in various embodiments, interior 102 of the vehicle may accommodate more or fewer passengers, and in various positions or configurations. For example, for some vehicles, interior 102 may merely have two seats, while for other vehicles, interior 102 may have three or even four rows of seats.

The various seating areas of interior 102 may be positioned with respect to other areas of interior 102 that are relevant to the disclosed methods and systems. Turning to FIG. 1B, seating areas 110, 120, 130, and 140 are positioned proximate to, respectively, a first door area 112, a second door area 122, a third door area 132, and a fourth door area 142. First seating area 110 and second seating area 120 are also positioned near a dashboard area 152 in the front portion of interior 102, while third seating area 130 and fourth seating area 140 are positioned near a rear deck area 162 in the rear portion of interior 102.

During operation of vehicle 100, a first audio performance may be started. In various embodiments, the first audio performance may be a prerecorded audio performance (including, without limitation, a performance stored on compact disc or another digital storage medium). The first performance may be played in a variety of ways, such as by being played over a set of speakers in vehicle 100 by an infotainment system.

Following the initiation of the first audio performance, a second audio performance may be started. In various embodiments, the second audio performance may be a live vocal performance undertaken by a passenger of vehicle 100. Turning to FIG. 1C, for example, a front passenger 124 in second seating area 110 may begin singing. (Alternatively, a first rear passenger 134 in third seating area 130, a second rear passenger 144 in fourth seating area 140, or a driver 114 in first seating area 110 may begin singing.)

As discussed further herein, an audio performance by driver 114, passenger 124, passenger 134, and/or passenger 144 may be detected and identified as being performed at (and originating from) the corresponding seating area within vehicle 100, such as first seating area 110, second seating area 120, third seating area 140, or fourth seating area 150. In some instances, the identification of the seating area in which the audio performance is to occur may be indicated by a user (e.g., one of the occupants of vehicle 100), such as by selection. In other instances, the identification may be performed by vehicle 100 itself, along with detecting and capturing the second audio performance.

One or more properties of the first audio performance (such as volume levels associated with various aspects of the first audio performance) may be modified based on the detection of the second audio performance. For example, a volume level of the first audio performance may be lowered upon detection of the second audio performance. The second audio performance may then be played in addition to the modified first audio performance over a set of speakers of vehicle 100.

As a result, driver 114, passenger 124, passenger 134, and/or passenger 134 may participate in karaoke performances within vehicle 100 (as discussed further herein) without manually exchanging microphones, and in ways that substantially improve their enjoyment of the karaoke performance.

Turning to FIG. 2, a vehicle 200 (which may be substantially similar to vehicle 100) has a first seating area 210, a second seating area 220, a third seating area 230, and a fourth seating area 240. First seating area 210 and second seating area 220 are positioned in a front portion of an interior of vehicle 200, while third sitting are 230 and fourth sitting area 240 are positioned in a rear portion of an interior of vehicle 200.

Vehicle 200 has one or more sets of microphones positioned with respect to seating areas 210, 220, 230, and 240 to facilitate combining prerecorded audio performances and live audio performances. For example, the front portion of the interior of vehicle 200 may have a first set of microphones 216 positioned proximate to first seating area 210 and a second set of microphones 226 positioned proximate to second seating area 220. Similarly, the rear portion of an interior of vehicle 200 may have a third set of microphones 236 positioned proximate to third seating area 230, and a fourth set of microphones 246 positioned proximate to fourth seating are 240.

Each of the sets of microphones 216, 226, 236, and 246 may comprise one or more microphones, which may include beamforming microphone arrays (or other microphone arrays). Although depicted as corresponding with seating areas 210, 220, 230, and 240, in some embodiments, the microphones may correspond with other areas of vehicle 200 (such as door areas, dashboard areas, rear deck areas, or areas between and/or around the aforementioned areas). Moreover, in some embodiments, vehicle 200 may incorporate one or more omni-directional microphones and/or one or more directional microphones, either instead of or in addition to beamforming microphone arrays.

In some embodiments, beamforming microphone arrays of vehicle 200 may be broad-firing (e.g., with an orientation of the array perpendicular to a seat within a seating area). For some embodiments, beamforming microphone arrays of vehicle 200 may be end-firing (e.g., with an orientation of the array parallel to the seat within the seating area). End-firing beamforming microphone arrays may facilitate improved identification of areas from which sounds are originating.

Turning now to FIG. 3, a vehicle 300 (which may be substantially similar to vehicle 100) has a first door area 312, a second door area 322, a third door area 332, and a fourth door area 342. Vehicle 300 also has a dashboard area 352 and a rear deck area 362. Dashboard area 352, first door area 312, and second door area 322 are positioned in a front portion of an interior of vehicle 300, while third door area 332, fourth door area 342, and rear deck area 362 are positioned in a rear portion of an interior of vehicle 300.

Vehicle 300 also has a set of speakers positioned around a periphery of its seating areas (e.g., in a surround-sound configuration). For example, the front portion of the interior of vehicle 300 has one or more first door speakers 318 positioned in first door area 312, one or more second door speakers 328 positioned in second door area 322, and one or more dashboard speakers 358 positioned in dashboard area 352 Similarly, the rear portion of the interior of vehicle 300 may have one or more third door speakers 338 positioned in third door area 332, one or more fourth door speakers 348 positioned in fourth door are 342, and one or more rear deck speakers 366 positioned in rear deck area 362

In various embodiments, vehicle 300 may incorporate any number of speakers, and may also incorporate speakers at any positions within any of the various areas described above (e.g., door areas, dashboard areas, and/or rear-deck areas). For some embodiments, vehicle 300 may incorporate speakers within a periphery of the seating area (e.g., at various seating areas and/or between various seating areas).

Turning now to FIG. 4, a system 400 for combining two audio performances in a space (e.g., a vehicle) comprises a set of microphones 402, a set of speakers 408, and a processing portion 410. In turn, processing portion 410 may comprise a performance-detection portion 420, a first performance-modification portion 432, a second performance-modification portion 434, a recording portion 440, and a mixing portion 450.

As discussed herein, a first performance 412 may be initiated within the space (e.g., a prerecorded audio performance), such as by being played aloud. Following the initiated of first performance 412, a second audio performance 414 may be started within the space (e.g., a live vocal performance), such as by an occupant of the space singing along with first performance 412. Microphones 402 may capture sounds within the space and send them to processing portion 410. In the course of doing so, the sounds captured by microphones 402 may carry second audio performance 414.

Performance-detection portion 420 may process the sounds from microphones 402, such as by using echo-cancellers and/or noise-cancellers, in order to detect second performance 414. The echo-cancellers and noise-cancellers may reduce or eliminate various other sounds in the space, such as first performance 412 itself (or, for vehicular embodiments, road noises).

Moreover, the echo-cancellers and/or noise-cancellers may reduce or eliminate sounds from other occupants within the space. In some instances, the portion or area of the space in which the performing occupant is situated may be identified and associated with the performance before-hand, such as by being selected (e.g., manually, by verbal command, or by any other directed manner). For some instances, the portion or area of the space in which the performing occupant is situated may be initially established by performance-detection portion 420 (e.g., on-the-fly). Once the area of the space in which the performing occupant is situated has been identified, the echo-cancellers and/or noise-cancellers may reduce or eliminate sounds from originating from other areas of the space, in which other occupants may be situated (e.g., cross-talk within the space). In some embodiments, the echo-cancellers and/or noise-cancellers may be tuned to optimize vocal quality (which may come at the expense of greater isolation or separation of sounds from different areas within the space).

Once performance-detection portion 420 has detected second performance 420, first performance-modification portion 432 may modify one or more properties of first performance 412, such as by ducking one or more audio volumes of first performance 412. This ducking may provide a type of feedback to performers, which may improve and/or otherwise enhance the experience.

In some embodiments, content of first performance 412 within one or more frequencies ranges may be ducked. For example, content in a mid-band frequency range encompassing a majority of vocal frequencies may be ducked. For some embodiments, one or more audio channels of first performance 412 may be ducked before being presented to an up-mixer or surround-sound algorithm. For example, a center audio channel may be ducked before being up-mixed or presented to the surround-sound algorithm. In some embodiments, audio of first performance 412 being sent to one or more speakers within the space may be ducked, or one or more audio channels (e.g., a center channel) may be ducked, up to and including audio sent to all speakers in the space (e.g., encompassing all of first performance 412). For some embodiments, a source separation tool may be used to pre-process first performance 412 and identify different musical tracks therein, which may then be ducked. For example, a pre-processing tool may identify a vocal track within first performance 412, which may be ducked.

In various embodiments, audio volumes of first performance 412 falling under more than one category may be ducked. For example, in some embodiments, mid-band frequency ranges for a center audio channel (and/or correlated audio content) may be ducked before being up-mixed or presented to the surround-sound algorithm. Similarly, for various embodiments, multiple categories of audio volumes of first performance 412 may be ducked. For example, in some embodiments, mid-band frequency ranges may be ducked, and a center audio channel may also be ducked before being up-mixed or presented to the surround-sound algorithm.

In addition, once performance-detection portion 420 has detected second performance 420, second performance-modification portion 434 may modify one or more properties of second performance 414, such as by providing reverberation and/or compression (or another type of audio tuning). In some embodiments, reverberation and/or compression may be introduced to sounds captured by microphones 402 (e.g., locally at microphones 402, or downstream at processing portion 410). In various embodiments, reverberation and/or compression may be introduced before and/or after recording portion 440.

For various embodiments, modifications to second performance 414 may be targeted in different ways to different speakers within the set of speakers 408. For example, greater reverberation (and/or other tuning) may be given to speakers that are located proximate to an area in which the performer is situated. This may advantageously enhance the ability of the performer to hear their own voice, and may provide some reinforcement to their voice within the space.

Second performance-modification portion 434 may then present a modified version of second performance 414 to recording portion 440, which may record the performer's voice (e.g., while they are singing). As modified, second performance 414 may include, for example, reverberation and compression (as discussed herein).

Accordingly, first performance-modification portion 432 and recording portion 440 may present modified versions of first performance 412 and second performance 414 to mixing portion 450. In turn, mixing portion 450 may combine the two performances and send the combined performance to speakers 408. First performance 412 and second performance 414 may thereby be processed on separate paths, then mixed together to create a new performance, e.g., in which the voice of the performer in second performance 414 replaces the main vocals in first performance 412.

System 400 may thus advantageously enable a live performer to accompany a prerecorded performance while hearing the outcome of the combined performance as well, enabling real-time feedback. System 400 may also advantageously permit the creation of a recorded performance out of a performer's accompanying performance (e.g., second performance 414).

In some embodiments, recording portion 440 may optionally be absent. For some embodiments, a recording portion downstream of mixing portion 450 (which may be substantially similar to recording portion 440) may be present. Some embodiments may include both recording portion 440 as well as another recording portion downstream of mixing portion 450.

In some embodiments, the echo-cancellation and noise-cancellation used to detect second performance 414 may remove portions of the audio before passing it to second performance-modification portion 434. In some embodiments, all of first performance 412 may be removed, and recording portion 440 may then record solely the vocal performance of the performer, with none of the first audio performance.

Although discussed herein as being applicable in vehicles, other environments or spaces may be applicable. For example, a more conventional studio environment may employ designs such as those discussed herein.

In some embodiments, echo-cancellation and/or noise-cancellation may accommodate a tuning (e.g., a reverberation) introduced by second performance-modification portion 434. For example, an applied reverberation may be tuned to be low enough within the space (e.g., a vehicle) that a highly-directional microphone (e.g., of microphones 402) might not record an echoed performance.

For some embodiments, where echo-cancellation may result in a reduction of high frequencies, system 400 may recover high frequencies lost (e.g., in highly-compressed tracks).

In various vehicular embodiments, system 400 may interface with one or more other systems of a vehicle. For example, in some embodiments, system 400 may interface with a lighting system, which may alter colors of lighting when system 400 is recording, or when a user is getting close to a performance-degradation condition (e.g., "clipping"). Lighting modifications may be associated with particular seating areas (e.g., front seat areas or back seat areas).

For some vehicular embodiments, system 400 may interface with systems handling incoming phone calls. For example, incoming phone calls may be ignored, or may automatically interrupt the playing of first performance 412, second performance 414, or both. In some vehicular embodiments, system 400 may similarly be interrupted upon the detection of a condition bearing upon the safety of the vehicle and/or its occupants.

In some vehicular embodiments, system 400 may interface with systems detecting the raising or lowering of windows, convertible hoods, and other portions of the vehicle that may impact the audio performance, either by reducing or ending the performance process, or by increasing one or more volumes to overcome the impact.

In view of the above discussion, a first usage example, a second usage example, and a third usage example are described below, based upon vehicle 100 incorporating system 400 with its microphone arrays 402 (similar to FIG. 2), its set of speakers 408 (similar to FIG. 3), and its processing portion 410 (as in FIG. 4). In the first usage example, a driver and a first passenger occupy seating areas 110 and 120 in the front portion of interior 102, while a second passenger and third passenger occupy seating areas 130 and 140 in the rear portion of interior 102. The second passenger is performing karaoke, while the driver, the first passenger, and the third passenger are attending to the performance.

Seating area 120 is indicated to be the seating area from which the karaoke performance is to occur, such as by being selected manually via an in-vehicle computing system and/or infotainment system as disclosed herein. For example, the performance may be indicated as occurring from seating area 120 by a touch screen of the in-vehicle computing system and/or infotainment system. Meanwhile, a prerecorded audio performance may be queued up and initiated (e.g., via compact disc, a smart device coupled to the computing system and/or infotainment system, or another means).

Various beamforming microphone arrays of microphones 402 may be associated with seating areas 110, 120, 130, and 140. By capturing audio signals through the use of the beamforming microphone arrays, performance-detection portion 420 of processing portion 410 may detect the live audio performance when it occurs in seating area 120. As part of the detection, echo-cancellers and/or noise-cancellers may process the captured audio signals to reduce or eliminate various other sounds in the space, such as road noise, or any sounds that may be identified as originating outside seating area 120.

Following the detection of the live performance, first modification portion 432 may modify the prerecorded performance by ducking mid-band frequency ranges (to suppress prerecorded vocals) from speakers 408 positioned proximate to the active seating area (e.g., speakers adjacent to that seating in various areas of interior 102). Second modification portion 434 may introduce reverberation and/or compression to the captured live performance, and mixing portion 450 may thereafter mix the modified version of the prerecorded performance with the modified version of the live performance.

In the first usage example, system 400 may be configured to ignore incoming phone calls, and to end the combined performance if otherwise interrupted so that the occupants of vehicle 100 may focus on the performance. Similarly, the rolling-down of a window (or a convertible top) may be seen as a noise-generating event signaling the intended end of the combined performance, and system 400 may cease creation of the combined performance accordingly.

In the second usage example, a driver occupies seating area 110 in the front portion of interior 102, while a first passenger and second passenger occupy seating areas 130 and 140 in the rear portion of interior 102. The first and second passengers are performing karaoke alternatingly, while the driver is focusing on driving.

In contrast with the first usage example, in the second usage example, the identification of seating areas 130 and 140 as being seating areas from which the karaoke performance occurs is performed using portions of system 400 as disclosed herein (e.g., as part of a computing system and/or infotainment system of vehicle 100). So, for example, microphone arrays associated with seating areas 110, 120, 130, and 140 may identify live audio performances originating alternatingly from seating areas 130 and 140, and may alternatingly configure the modification of the prerecorded audio performances and/or the live audio performances in an accordingly alternating manner. In comparison with the first usage example, the passengers in the second usage example are pleased to sing along with whatever song happens to be playing on the radio.

In the second usage example, audio signals captured through the beamforming microphone arrays may be processed by performance-detection portion 420 to detect when live performances are occurring in any of seating areas 110, 120, 130, and/or 140. Echo-cancellers and/or noise-cancellers may be applied to separately reduce or eliminate various sounds outside of each seating area, and to separately evaluate whether and/or when a live performance is detected as occurring in any seating area.

Once detected, first modification portion 432 may then modify the prerecorded performance by ducking one or more speakers adjacent to the seating area from which the performance is detected at the moment (and/or to audio channels serving any such speakers).

In contrast with the first usage example, second modification portion 434 might not introduce any tuning to the captured live performance, and mixing portion 450 may thereafter mix the modified version of the prerecorded performance with the unmodified live performance.

In the second usage example, system 400 may be configured to accept incoming phone calls, which the occupants may deem more important than their karaoke experience. Moreover, the rolling-down of a window may be seen as an unintentional event (or at any rate as an event not intended to end the karaoke performance), and system 400 may operate in the noisier environment at a reduced level of functionality until more normal operation may be restored (e.g., until windows are rolled up once more).

In the third usage example, vehicle 100 carries a driver and one or more passengers whose seating areas are divided into a plurality of zones. For example, seating areas for the driver and/or one or more of the passengers may correspond with a first zone, while seating for one or more other passengers may correspond with a second zone. In various embodiments, the seating areas may correspond in any way with any number of zones, with each zone corresponding with one or more seating areas (up to and including one seating area per zone).

One of the zones may be indicated as a primary zone, while one or more other zones may be indicated as secondary zones. In the second audio performance, audio captured by microphone arrays 402 that is identified as originating from the primary zone may be segregated from audio captured by microphone arrays 402 that is identified as originating from a secondary zone. The primary zone may be handled as the zone from which a main performance is originating (e.g., from a main singer), while a secondary zone may be handled as a zone from which a supporting performance is originating (e.g., from one or more backup singers). In various embodiments, system 400 may accordingly capture multiple second performances.

Audio captured from the primary zone and audio captured from a secondary zone may then be tuned differently, e.g., by second modification portion 434 (such as by applying different reverberation, compression, gain, and/or equalization). For example, additional tuning could be applied to audio captured from the secondary zone (e.g., gain reduction, compression, and/or equalization) such that the audio captured from the secondary zone is appropriate for backup singers. The audio may also be recorded separately (e.g., by recording portion 440) and/or treated differently in the mixing process (e.g., by mixing portion 450).

In some embodiments, the various seating areas may be indicated as corresponding with the various zones by manual configuration (e.g., via an in-vehicle computing system and/or infotainment system as disclosed herein). Similarly, the various zones may be indicated as being primary or secondary by manual configuration.

FIG. 5 shows a flow chart of a method 500 for combining two audio performances in a space (e.g., within a vehicle). At a first part 510, a first audio performance may be started through a set of speakers within a space. For example, a prerecorded audio performance may begin to be played. At a second part 520, live sounds may be captured through a set of microphones. In some embodiments, the microphones may be part of one or more beamforming microphone arrays.

At a third part 530, a second audio performance may be detected at an area within the space. For example, a live vocal performance may be detected at a seating area within a vehicle.

At a fourth part 540, various properties of the first performance may be modified based on the detection of the second performance. For example, one or more audio volumes of the first performance may be ducked. At a fifth part 550, various properties of the second performance may be modified. For example, a compression, a reverberation, and/or other types of tuning may modify the second performance.

At a sixth part 560, the second performance (as modified) may be recorded. Then, at a seventh part, a combined audio performance may be mixed together based upon the first performance (as modified) and the second performance (as modified). At an eighth part 580, the combined audio performance may be played.

FIG. 6 shows an example partial view of one type of environment for an audio customization system: an interior of a cabin 600 of a vehicle 602, in which a driver and/or one or more passengers may be seated. Vehicle 602 of FIG. 6 may be a motor vehicle including drive wheels (not shown) and an internal combustion engine 604 (such as vehicles 100, 200, and/or 300). Internal combustion engine 604 may include one or more combustion chambers which may receive intake air via an intake passage and exhaust combustion gases via an exhaust passage. Vehicle 602 may be a road automobile, among other types of vehicles. In some examples, vehicle 602 may include a hybrid propulsion system including an energy conversion device operable to absorb energy from vehicle motion and/or the engine and convert the absorbed energy to an energy form suitable for storage by an energy storage device. Vehicle 602 may include a fully electric vehicle, incorporating fuel cells, solar energy capturing elements, and/or other energy storage systems for powering the vehicle.

As shown, an instrument panel 606 may include various displays and controls accessible to a human driver (also referred to as the user) of vehicle 602. For example, instrument panel 606 may include a touch screen 608 of an in-vehicle computing system 609 (e.g., an infotainment system), an audio system control panel, and an instrument cluster 610. In-vehicle computing system or infotainment system 609 may be an example of an infotainment system of vehicle 100 shown in FIGS. 1A-1C. Touch screen 608 may receive user input to the in-vehicle computing system or infotainment system 609 for controlling audio output, visual display output, user preferences, control parameter selection, etc. While the example system shown in FIG. 6 includes audio system controls that may be performed via a user interface of in-vehicle computing system or infotainment system 609, such as touch screen 608 without a separate audio system control panel, in other embodiments, the vehicle may include an audio system control panel, which may include controls for a conventional vehicle audio system such as a radio, compact disc player, MP3 player, etc. The audio system controls may include features for controlling one or more aspects of audio output via speakers 612 of a vehicle speaker system. For example, the in-vehicle computing system or the audio system controls may control a volume of audio output, a distribution of sound among the individual speakers of the vehicle speaker system, an equalization of audio signals, and/or any other aspect of the audio output. In further examples, in-vehicle computing system or infotainment system 609 may adjust a radio station selection, a playlist selection, a source of audio input (e.g., from radio or CD or MP3), etc., based on user input received directly via touch screen 608, or based on data regarding the user (such as a physical state and/or environment of the user) received via external devices 650 and/or mobile device 628. The audio system of the vehicle may include an amplifier (not shown) coupled to plurality of loudspeakers (not shown). In some embodiments, one or more hardware elements of in-vehicle computing system or infotainment system 609, such as touch screen 608, a display screen 611, various control dials, knobs and buttons, memory, processor(s), and any interface elements (e.g., connectors or ports) may form an integrated head unit that is installed in instrument panel 606 of the vehicle. The head unit may be fixedly or removably attached in instrument panel 606. In additional or alternative embodiments, one or more hardware elements of the in-vehicle computing system or infotainment system 609 may be modular and may be installed in multiple locations of the vehicle.

The cabin 600 may include one or more sensors for monitoring the vehicle, the user, and/or the environment. For example, the cabin 600 may include one or more seat-mounted pressure sensors configured to measure the pressure applied to the seat to determine the presence of a user, door sensors configured to monitor door activity, humidity sensors to measure the humidity content of the cabin, microphones to receive user input in the form of voice commands, to enable a user to conduct telephone calls, and/or to measure ambient noise in the cabin 600, etc. It is to be understood that the above-described sensors and/or one or more additional or alternative sensors may be positioned in any suitable location of the vehicle. For example, sensors may be positioned in an engine compartment, on an external surface of the vehicle, and/or in other suitable locations for providing information regarding the operation of the vehicle, ambient conditions of the vehicle, a user of the vehicle, etc. Information regarding ambient conditions of the vehicle, vehicle status, or vehicle driver may also be received from sensors external to/separate from the vehicle (that is, not part of the vehicle system), such as sensors coupled to external devices 650 and/or mobile device 628.

Cabin 600 may also include one or more user objects, such as mobile device 628, that are stored in the vehicle before, during, and/or after travelling. The mobile device 628 may include a smart phone, a tablet, a laptop computer, a portable media player, and/or any suitable mobile computing device. The mobile device 628 may be connected to the in-vehicle computing system via communication link 630. The communication link 630 may be wired (e.g., via Universal Serial Bus [USB], Mobile High-Definition Link [MHL], High-Definition Multimedia Interface [HDMI], Ethernet, etc.) or wireless (e.g., via Bluetooth, WIFI, WIFI direct, Near-Field Communication [NFC], cellular connectivity, etc.) and configured to provide two-way communication between the mobile device and the in-vehicle computing system. The mobile device 628 may include one or more wireless communication interfaces for connecting to one or more communication links (e.g., one or more of the example communication links described above). The wireless communication interface may include one or more physical devices, such as antenna(s) or port(s) coupled to data lines for carrying transmitted or received data, as well as one or more modules/drivers for operating the physical devices in accordance with other devices in the mobile device. For example, the communication link 630 may provide sensor and/or control signals from various vehicle systems (such as vehicle audio system, climate control system, etc.) and the touch screen 608 to the mobile device 628 and may provide control and/or display signals from the mobile device 628 to the in-vehicle systems and the touch screen 608. The communication link 630 may also provide power to the mobile device 628 from an in-vehicle power source in order to charge an internal battery of the mobile device.

In-vehicle computing system or infotainment system 609 may also be communicatively coupled to additional devices operated and/or accessed by the user but located external to vehicle 602, such as one or more external devices 650. In the depicted embodiment, external devices are located outside of vehicle 602 though it will be appreciated that in alternate embodiments, external devices may be located inside cabin 600. The external devices may include a server computing system, personal computing system, portable electronic device, electronic wrist band, electronic head band, portable music player, electronic activity tracking device, pedometer, smart-watch, GPS system, etc. External devices 650 may be connected to the in-vehicle computing system via communication link 636 which may be wired or wireless, as discussed with reference to communication link 630, and configured to provide two-way communication between the external devices and the in-vehicle computing system. For example, external devices 650 may include one or more sensors and communication link 636 may transmit sensor output from external devices 650 to in-vehicle computing system 609 and touch screen 608. External devices 650 may also store and/or receive information regarding contextual data, user behavior/preferences, operating rules, etc. and may transmit such information from the external devices 650 to in-vehicle computing system 609 and touch screen 608.

In-vehicle computing system 609 may analyze the input received from external devices 650, mobile device 628, and/or other input sources and select settings for various in-vehicle systems (such as climate control system or audio system), provide output via touch screen 608 and/or speakers 612, communicate with mobile device 628 and/or external devices 650, and/or perform other actions based on the assessment. In some embodiments, all or a portion of the assessment may be performed by the mobile device 628 and/or the external devices 650.

In some embodiments, one or more of the external devices 650 may be communicatively coupled to in-vehicle computing system or infotainment system 609 indirectly, via mobile device 628 and/or another of the external devices 650. For example, communication link 636 may communicatively couple external devices 650 to mobile device 628 such that output from external devices 650 is relayed to mobile device 628. Data received from external devices 650 may then be aggregated at mobile device 628 with data collected by mobile device 628, the aggregated data then transmitted to in-vehicle computing system 609 and touch screen 608 via communication link 630. Similar data aggregation may occur at a server system and then transmitted to in-vehicle computing system or infotainment system 609 and touch screen 608 via communication link 636 and/or communication link 630.

FIG. 7 shows a block diagram of an in-vehicle computing system or infotainment system 609 configured and/or integrated inside vehicle 602. In-vehicle computing system or infotainment system 609 may perform one or more of the methods described herein in some embodiments. In some examples, the in-vehicle computing system or infotainment system 609 may be a vehicle infotainment system configured to provide information-based media content (audio and/or visual media content, including entertainment content, navigational services, etc.) to a vehicle user to enhance the operator's in-vehicle experience. The vehicle infotainment system 609 may include, or be coupled to, various vehicle systems, sub-systems, hardware components, as well as software applications and systems that are integrated in, or integratable into, vehicle 602 in order to enhance an in-vehicle experience for a driver and/or a passenger.

In-vehicle computing system or infotainment system 609 may include one or more processors including an operating system processor 714 and an interface processor 720. Operating system processor 714 may execute an operating system on the in-vehicle computing system, and control input/output, display, playback, and other operations of the in-vehicle computing system. Interface processor 720 may interface with a vehicle control system 730 via an inter-vehicle system communication module 722.

Inter-vehicle system communication module 722 may output data to other vehicle systems 731 and vehicle control elements 761, while also receiving data input from other vehicle components and systems 731, 761, e.g. by way of vehicle control system 730. When outputting data, inter-vehicle system communication module 722 may provide a signal via a bus corresponding to any status of the vehicle, the vehicle surroundings, or the output of any other information source connected to the vehicle. Vehicle data outputs may include, for example, analog signals (such as current velocity), digital signals provided by individual information sources (such as clocks, thermometers, location sensors such as Global Positioning System [GPS] sensors, etc.), digital signals propagated through vehicle data networks (such as an engine CAN bus through which engine related information may be communicated, a climate control CAN bus through which climate control related information may be communicated, and a multimedia data network through which multimedia data is communicated between multimedia components in the vehicle). For example, the in-vehicle computing system or infotainment system 609 may retrieve from the engine CAN bus the current speed of the vehicle estimated by the wheel sensors, a power state of the vehicle via a battery and/or power distribution system of the vehicle, an ignition state of the vehicle, etc. In addition, other interfacing means such as Ethernet may be used as well without departing from the scope of this disclosure.

A non-volatile storage device 708 may be included in in-vehicle computing system or infotainment system 609 to store data such as instructions executable by processors 714 and 720 in non-volatile form. The storage device 708 may store application data, including prerecorded sounds, to enable the in-vehicle computing system or infotainment system 609 to run an application for connecting to a cloud-based server and/or collecting information for transmission to the cloud-based server. The application may retrieve information gathered by vehicle systems/sensors, input devices (e.g., user interface 718), data stored in volatile memory (e.g., storage device) 719A or non-volatile memory (e.g., storage device) 719B, devices in communication with the in-vehicle computing system (e.g., a mobile device connected via a Bluetooth link), etc. In-vehicle computing system or infotainment system 609 may further include a volatile memory 719A. Volatile memory 719A may be random access memory (RAM). Non-transitory storage devices, such as non-volatile storage device 708 and/or non-volatile memory 719B, may store instructions and/or code that, when executed by a processor (e.g., operating system processor 714 and/or interface processor 720), controls the in-vehicle computing system or infotainment system 609 to perform one or more of the actions described in the disclosure. Accordingly, in various embodiments, in-vehicle computing system or infotainment system 609 (or another computing system of vehicle 602) may comprise one or more processors (e.g., processor 714, processor 720, and/or one or more other processors) having executable instructions stored in a memory (e.g., volatile memory 719A, non-volatile memory 719B, and/or one or more other memories) that, when executed, cause the one or more processors perform one or more of the methods described herein (e.g., method 500).

A microphone 702 may be included in the in-vehicle computing system or infotainment system 609 to receive voice commands from a user, to measure ambient noise in the vehicle, to determine whether audio from speakers of the vehicle is tuned in accordance with an acoustic environment of the vehicle, etc. A speech processing unit 704 may process voice commands, such as the voice commands received from the microphone 702. In some embodiments, in-vehicle computing system or infotainment system 609 may also be able to receive voice commands and sample ambient vehicle noise using a microphone included in an audio system 732 of the vehicle.

One or more additional sensors may be included in a sensor subsystem 710 of the in-vehicle computing system or infotainment system 609. For example, the sensor subsystem 710 may include a camera, such as a rear view camera for assisting a user in parking the vehicle and/or a cabin camera for identifying a user (e.g., using facial recognition and/or user gestures). Sensor subsystem 710 of in-vehicle computing system or infotainment system 609 may communicate with and receive inputs from various vehicle sensors and may further receive user inputs. For example, the inputs received by sensor subsystem 710 may include transmission gear position, transmission clutch position, gas pedal input, brake input, transmission selector position, vehicle speed, engine speed, mass airflow through the engine, ambient temperature, intake air temperature, etc., as well as inputs from climate control system sensors (such as heat transfer fluid temperature, antifreeze temperature, fan speed, passenger compartment temperature, desired passenger compartment temperature, ambient humidity, etc.), an audio sensor detecting voice commands issued by a user, a fob sensor receiving commands from and optionally tracking the geographic location/proximity of a fob of the vehicle, etc.

While certain vehicle system sensors may communicate with sensor subsystem 710 alone, other sensors may communicate with both sensor subsystem 710 and vehicle control system 730, or may communicate with sensor subsystem 710 indirectly via vehicle control system 730. A navigation subsystem 711 of in-vehicle computing system or infotainment system 609 may generate and/or receive navigation information such as location information (e.g., via a GPS sensor and/or other sensors from sensor subsystem 710), route guidance, traffic information, point-of-interest (POI) identification, and/or provide other navigational services for the driver.

External device interface 712 of in-vehicle computing system or infotainment system 609 may be coupleable to and/or communicate with one or more external devices 650 located external to vehicle 602. While the external devices are illustrated as being located external to vehicle 602, it is to be understood that they may be temporarily housed in vehicle 602, such as when the user is operating the external devices while operating vehicle 602. In other words, the external devices 650 are not integral to vehicle 602. The external devices 650 may include a mobile device 628 (e.g., connected via a Bluetooth, NFC, WIFI direct, or other wireless connection) or an alternate Bluetooth-enabled device 752.

Mobile device 628 may be a mobile phone, smart phone, wearable devices/sensors that may communicate with the in-vehicle computing system via wired and/or wireless communication, or other portable electronic device(s). Other external devices include external services 746. For example, the external devices may include extra-vehicular devices that are separate from and located externally to the vehicle. Still other external devices include external storage devices 754, such as solid-state drives, pen drives, USB drives, etc. External devices 650 may communicate with in-vehicle computing system or infotainment system 609 either wirelessly or via connectors without departing from the scope of this disclosure. For example, external devices 650 may communicate with in-vehicle computing system or infotainment system 609 through the External device interface 712 over network 760, a universal serial bus (USB) connection, a direct wired connection, a direct wireless connection, and/or other communication link.

The External device interface 712 may provide a communication interface to enable the in-vehicle computing system to communicate with mobile devices associated with contacts of the driver. For example, the External device interface 712 may enable phone calls to be established and/or text messages (e.g., SMS, MMS, etc.) to be sent (e.g., via a cellular communications network) to a mobile device associated with a contact of the driver. The External device interface 712 may additionally or alternatively provide a wireless communication interface to enable the in-vehicle computing system to synchronize data with one or more devices in the vehicle (e.g., the driver's mobile device) via WIFI direct, as described in more detail below.

One or more applications 744 may be operable on mobile device 628. As an example, a mobile device application 744 may be operated to aggregate user data regarding interactions of the user with the mobile device. For example, mobile device application 744 may aggregate data regarding music playlists listened to by the user on the mobile device, telephone call logs (including a frequency and duration of telephone calls accepted by the user), positional information including locations frequented by the user and an amount of time spent at each location, etc. The collected data may be transferred by application 744 to External device interface 712 over network 760. In addition, specific user data requests may be received at mobile device 628 from in-vehicle computing system or infotainment system 609 via the External device interface 712. The specific data requests may include requests for determining where the user is geographically located, an ambient noise level and/or music genre at the user's location, an ambient weather condition (temperature, humidity, etc.) at the user's location, etc. Mobile device application 744 may send control instructions to components (e.g., microphone, amplifier etc.) or other applications (e.g., navigational applications) of mobile device 628 to enable the requested data to be collected on the mobile device or requested adjustment made to the components. Mobile device application 744 may then relay the collected information back to in-vehicle computing system or infotainment system 609.

Likewise, one or more applications 748 may be operable on external services 746. As an example, external services applications 748 may be operated to aggregate and/or analyze data from multiple data sources. For example, external services applications 748 may aggregate data from one or more social media accounts of the user, data from the in-vehicle computing system (e.g., sensor data, log files, user input, etc.), data from an internet query (e.g., weather data, POI data), etc. The collected data may be transmitted to another device and/or analyzed by the application to determine a context of the driver, vehicle, and environment and perform an action based on the context (e.g., requesting/sending data to other devices).

Vehicle control system 730 may include controls for controlling aspects of various vehicle systems 731 involved in different in-vehicle functions. These may include, for example, controlling aspects of vehicle audio system 732 for providing audio entertainment to the vehicle occupants, aspects of climate control system 734 for meeting the cabin cooling or heating needs of the vehicle occupants, as well as aspects of telecommunication system 736 for enabling vehicle occupants to establish telecommunication linkage with others.

Audio system 732 may include one or more acoustic reproduction devices including electromagnetic transducers such as speakers 735. Vehicle audio system 732 may be passive or active such as by including a power amplifier. In some examples, in-vehicle computing system or infotainment system 609 may be the sole audio source for the acoustic reproduction device or there may be other audio sources that are connected to the audio reproduction system (e.g., external devices such as a mobile phone). The connection of any such external devices to the audio reproduction device may be analog, digital, or any combination of analog and digital technologies.

Climate control system 734 may be configured to provide a comfortable environment within the cabin or passenger compartment of vehicle 602. Climate control system 734 includes components enabling controlled ventilation such as air vents, a heater, an air conditioner, an integrated heater and air-conditioner system, etc. Other components linked to the heating and air-conditioning setup may include a windshield defrosting and defogging system capable of clearing the windshield and a ventilation-air filter for cleaning outside air that enters the passenger compartment through a fresh-air inlet.

Vehicle control system 730 may also include controls for adjusting the settings of various vehicle controls 761 (or vehicle system control elements) related to the engine and/or auxiliary elements within a cabin of the vehicle, such as steering wheel controls 762 (e.g., steering wheel-mounted audio system controls, cruise controls, windshield wiper controls, headlight controls, turn signal controls, etc.), instrument panel controls, microphone(s), accelerator/brake/clutch pedals, a gear shift, door/window controls positioned in a driver or passenger door, seat controls, cabin light controls, audio system controls, cabin temperature controls, etc. Vehicle controls 761 may also include internal engine and vehicle operation controls (e.g., engine controller module, actuators, valves, etc.) that are configured to receive instructions via the CAN bus of the vehicle to change operation of one or more of the engine, exhaust system, transmission, and/or other vehicle system. The control signals may also control audio output at one or more speakers 735 of the vehicle's audio system 732. For example, the control signals may adjust audio output characteristics such as volume, equalization, audio image (e.g., the configuration of the audio signals to produce audio output that appears to a user to originate from one or more defined locations), audio distribution among a plurality of speakers, etc. Likewise, the control signals may control vents, air conditioner, and/or heater of climate control system 734. For example, the control signals may increase delivery of cooled air to a specific section of the cabin.

Control elements positioned on an outside of a vehicle (e.g., controls for a security system) may also be connected to computing system or infotainment system 609, such as via communication module 722. The control elements of the vehicle control system may be physically and permanently positioned on and/or in the vehicle for receiving user input. In addition to receiving control instructions from in-vehicle computing system or infotainment system 609, vehicle control system 730 may also receive input from one or more external devices 650 operated by the user, such as from mobile device 628. This allows aspects of vehicle systems 731 and vehicle controls 761 to be controlled based on user input received from the external devices 650.

In-vehicle computing system or infotainment system 609 may further include an antenna 706. Antenna 706 is shown as a single antenna, but may comprise one or more antennas in some embodiments. The in-vehicle computing system may obtain broadband wireless internet access via antenna 706, and may further receive broadcast signals such as radio, television, weather, traffic, and the like. The in-vehicle computing system or infotainment system 609 may receive positioning signals such as GPS signals via one or more antennas 706. The in-vehicle computing system may also receive wireless commands via FR such as via antenna(s) 706 or via infrared or other means through appropriate receiving devices. In some embodiments, antenna 706 may be included as part of audio system 732 or telecommunication system 736. Additionally, antenna 706 may provide AM/FM radio signals to external devices 650 (such as to mobile device 628) via External device interface 712.

One or more elements of the in-vehicle computing system or infotainment system 609 may be controlled by a user via user interface 718. User interface 718 may include a graphical user interface presented on a touch screen, such as touch screen 608 and/or display screen 611 of FIG. 6, and/or user-actuated buttons, switches, knobs, dials, sliders, etc. For example, user-actuated elements may include steering wheel controls, door and/or window controls, instrument panel controls, audio system settings, climate control system settings, and the like. A user may also interact with one or more applications of the in-vehicle computing system or infotainment system 609 and mobile device 628 via user interface 718. In addition to receiving a user's vehicle setting preferences on user interface 718, vehicle settings selected by in-vehicle control system may be displayed to a user on user interface 718. Notifications and other messages (e.g., received messages), as well as navigational assistance, may be displayed to the user on a display of the user interface. User preferences/information and/or responses to presented messages may be performed via user input to the user interface.

The description of embodiments has been presented for purposes of illustration and description. Suitable modifications and variations to the embodiments may be performed in light of the above description or may be acquired from practicing the methods. For example, unless otherwise noted, one or more of the described methods may be performed by a suitable device and/or combination of devices, such as the vehicle systems and cloud computing systems described above with respect to FIGS. 1-6. The methods may be performed by executing stored instructions with one or more logic devices (e.g., processors) in combination with one or more additional hardware elements, such as storage devices, memory, image sensors/lens systems, light sensors, hardware network interfaces/antennas, switches, actuators, clock circuits, and so on. The described methods and associated actions may also be performed in various orders in addition to the order described in this application, in parallel, and/or simultaneously. The described systems are exemplary in nature, and may include additional elements and/or omit elements. The subject matter of the present disclosure includes all novel and non-obvious combinations and sub-combinations of the various systems and configurations, and other features, functions, and/or properties disclosed.

The disclosure also provides support for a method comprising: starting a prerecorded first audio performance through a set of speakers within a space, detecting a second audio performance at an area within the space, modifying one or more properties of the first audio performance based upon the second audio performance, and providing a combined audio performance based upon the modified first audio performance and the second audio performance. In a first example of the method, the space comprises an interior of a vehicle. In a second example of the method, optionally including the first example, the method further comprises: recording the detected second audio performance at the area within the space. In a third example of the method, optionally including one or both of the first and second examples, the second audio performance is detected using a beamforming microphone array. In a fourth example of the method, optionally including one or more or each of the first through third examples, an echo-cancellation process is performed on the second audio performance. In a fifth example of the method, optionally including one or more or each of the first through fourth examples, the modifying of the one or more properties of the first audio performance includes lowering a volume corresponding with the first audio performance. In a sixth example of the method, optionally including one or more or each of the first through fifth examples, the lowered volume is associated with a frequency range. In a seventh example of the method, optionally including one or more or each of the first through sixth examples, the lowered volume is associated with an audio signal upstream from a mixing process. In an eighth example of the method, optionally including one or more or each of the first through seventh examples, the lowered volume is associated with one or more audio channels of the set of speakers. In a ninth example of the method, optionally including one or more or each of the first through eighth examples, the lowered volume is associated with one or more speakers of the set of speakers. In a tenth example of the method, optionally including one or more or each of the first through ninth examples, the lowered volume is associated with an entirety of the first audio performance. In an eleventh example of the method, optionally including one or more or each of the first through tenth examples, the lowered volume is associated with a vocal track of the audio performance. In a twelfth example of the method, optionally including one or more or each of the first through eleventh examples, the combined audio performance incorporates the modified first audio performance and the recorded second audio performance. In a thirteenth example of the method, optionally including one or more or each of the first through twelfth examples, the method further comprises: modifying one or more properties of the second audio performance among the set of speakers, wherein the combined audio performance is adjusted among the set of speakers based upon their positions relative to the area.

The disclosure also provides support for a method of blending audio performances within a vehicle, the method comprising: playing a first audio performance through a plurality of speakers within the vehicle, recording a second audio performance at a seating zone of the vehicle, ducking at least one audio volume associated with the first audio performance based upon a detection of the second audio performance, and playing the second audio performance in addition to the first audio performance based upon the detection of the second audio performance. In a first example of the method, the plurality of speakers is arranged in a surround-sound manner around at least a periphery of one or more seating zones of the vehicle. In a second example of the method, optionally including the first example, the method further comprises: detecting the second audio performance using a beamforming microphone array, wherein an echo-cancellation process is performed in the detection of the second audio performance, and wherein the at least one audio volume is an audio volume associated with at least one frequency range. In a third example of the method, optionally including one or both of the first and second examples, the method further comprises: modifying one or more properties of the second audio performance for at least some of the plurality of speakers based upon proximity to the seating zone of the vehicle, wherein the at least one audio volume is an audio volume associated with at least one of: one or more audio channels of the plurality of speakers, and one or more speakers of the plurality of speakers, and wherein the at least one audio volume is an audio volume associated with one or more tracks of the audio performance.

The disclosure also provides support for a system for combining prerecorded and live audio performances within a vehicle, comprising: a set of beamforming microphones directed to a plurality of seating areas within the vehicle, a set of speakers arranged in a surround-sound configuration around at least a periphery of the plurality of seating areas, and one or more processors having executable instructions stored in a non-transitory memory that, when executed, cause the one or more processors to: play a prerecorded first audio performance through the set of speakers, detect a live second audio performance at an identified seating area of the plurality of seating areas through the set of beamforming microphones, record the second audio performance, lower one or more volumes of the first audio performance based upon the second audio performance to create a modified first audio performance, and play the recorded second audio performance in combination with the modified first audio performance. In a first example of the system the executable instructions causing the one or more processors to: perform an echo-cancellation process on a set of audio feeds captured through the set of beamforming microphones, and modify one or more properties of the second audio performance among the set of speakers, wherein the detection of the live second audio performance is done on the set of audio feeds, and wherein the playing of the recorded second audio performance is adjusted among the set of speakers based upon their positions relative to the identified seating area.

As used in this application, an element or step recited in the singular and proceeded with the word "a" or "an" should be understood as not excluding plural of said elements or steps, unless such exclusion is stated. Furthermore, references to "one embodiment" or "one example" of the present disclosure are not intended to be interpreted as excluding the existence of additional embodiments that also incorporate the recited features. Terms such as "first," "second," "third," and so on are used merely as labels, and are not intended to impose numerical requirements or a particular positional order on their objects. The following claims particularly point out subject matter from the above disclosure that is regarded as novel and non-obvious.

As used herein, the term "approximately" is construed to mean plus or minus five percent of the range unless otherwise specified.

The following claims particularly point out certain combinations and sub-combinations regarded as novel and non-obvious. These claims may refer to "an" element or "a first" element or the equivalent thereof. Such claims should be understood to include incorporation of one or more such elements, neither requiring nor excluding two or more such elements. Other combinations and sub-combinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The invention claimed is:

1. A method comprising:

starting a prerecorded first audio performance through a set of speakers within a space;

detecting a second audio performance at a first area within the space and a third audio performance at a second area within the space;

alternatingly modifying one or more properties of the first audio performance based upon the second audio performance, and modifying the one or more properties of the first audio performance based upon the third audio performance; and providing a combined audio performance based upon the modified first audio performance, the second audio performance, and the third audio performance, wherein the second audio performance is at a first seating zone of the vehicle;

wherein the third audio performance is at one or more second seating zones of the vehicle; and wherein the first seating zone and the one or more second seating zones may be configured as at least one of: a primary zone from which a main performance is originating; and a secondary zone from which a supporting performance is originating.

2. The method of claim 1, wherein the space comprises an interior of a vehicle.

3. The method of claim 1, further comprising:

recording the detected second audio performance at the first area within the space; and recording the detected third audio performance at the second area within the space.

4. The method of claim 1, wherein the second audio performance is detected using a beamforming microphone array.

5. The method of claim 1, wherein an echo-cancellation process is performed on the second audio performance.

6. The method of claim 1, further comprising:

applying a first tuning to the second audio performance and a different second tuning to the third audio performance, wherein the modifying of the one or more properties of the first audio performance includes lowering a volume corresponding with the first audio performance.

7. The method of claim 6, wherein the lowered volume is associated with a frequency range.

8. The method of claim 6, wherein the lowered volume is associated with an audio signal upstream from a mixing process.

9. The method of claim 6, wherein the lowered volume is associated with one or more audio channels of the set of speakers.

10. The method of claim 6, wherein the lowered volume is associated with one or more speakers of the set of speakers.

11. The method of claim 6, wherein the lowered volume is associated with an entirety of the first audio performance.

12. The method of claim 6, wherein the lowered volume is associated with a vocal track of the audio performance.

13. The method of claim 3, wherein the combined audio performance incorporates the modified first audio performance and the recorded second audio performance.

14. The method of claim 1, further comprising:

modifying one or more properties of the second audio performance among the set of speakers, wherein the combined audio performance is adjusted among the set of speakers based upon their positions relative to the first area and the second area.

15. A method of blending audio performances within a vehicle, the method comprising:

playing a first audio performance through a plurality of speakers within the vehicle;

recording a second audio performance at a first seating zone of the vehicle and a third audio performance at one or more second seating zones of the vehicle;

ducking at least one audio volume associated with the first audio performance based upon a detection of the second audio performance;

applying a first tuning to the second audio performance and a different second tuning to the third audio performance;

playing the second audio performance in addition to the first audio performance based upon the detection of the second audio performance; and playing the third audio performance in addition to the first audio performance based upon the detection of the third audio performance.

16. The method of claim 15, wherein the plurality of speakers is arranged in a surround-sound manner around at least a periphery of one or more seating zones of the vehicle; and wherein the first seating zone and the one or more second seating zones may be configured as at least one of: a primary zone from which a main performance is originating; and a secondary zone from which a supporting performance is originating.

17. The method of claim 15, further comprising:

detecting the second audio performance using a beamforming microphone array, wherein an echo-cancellation process is performed in the detection of the second audio performance; and wherein the at least one audio volume is an audio volume associated with at least one frequency range.

18. The method of claim 15, further comprising:

modifying one or more properties of the second audio performance for at least some of the plurality of speakers based upon proximity to the seating zone of the vehicle, wherein the at least one audio volume is an audio volume associated with at least one of: one or more audio channels of the plurality of speakers; and one or more speakers of the plurality of speakers; and wherein the at least one audio volume is an audio volume associated with one or more tracks of the first audio performance.

19. A system for combining prerecorded and live audio performances within a vehicle, comprising:

a set of beamforming microphones directed to a plurality of seating areas within the vehicle;

a set of speakers arranged in a surround-sound configuration around at least a periphery of the plurality of seating areas; and one or more processors having executable instructions stored in a non-transitory memory that, when executed, cause the one or more processors to:

play a prerecorded first audio performance through the set of speakers;

detect a live second audio performance at an identified seating area of the plurality of seating areas through the set of beamforming microphones;

record the second audio performance;

modify one or more properties of the second audio performance to give a greater reverberation to one or more speakers among the set of speakers that are located proximate to the identified seating area;

lower one or more volumes of the first audio performance based upon the second audio performance to create a modified first audio performance; and play the recorded second audio performance in combination with the modified first audio performance.

20. The system for combining prerecorded and live audio performances within the vehicle of claim 19, the executable instructions causing the one or more processors to:

perform an echo-cancellation process on a set of audio feeds captured through the set of beamforming microphones; and alter one or more colors of a lighting system of the vehicle upon the second audio performance approaching a performance-degradation condition, wherein the detection of the live second audio performance is done on the set of audio feeds; and wherein the playing of the recorded second audio performance is adjusted among the set of speakers based upon their positions relative to the identified seating area.

* * * * *